G. C. HUGGINS.
FIELD WINDING MACHINE.
APPLICATION FILED MAY 3, 1917.

1,407,033.

Patented Feb. 21, 1922.
9 SHEETS—SHEET 2.

Inventor,
George C. Huggins,
by Albert G. Davis
His Attorney.

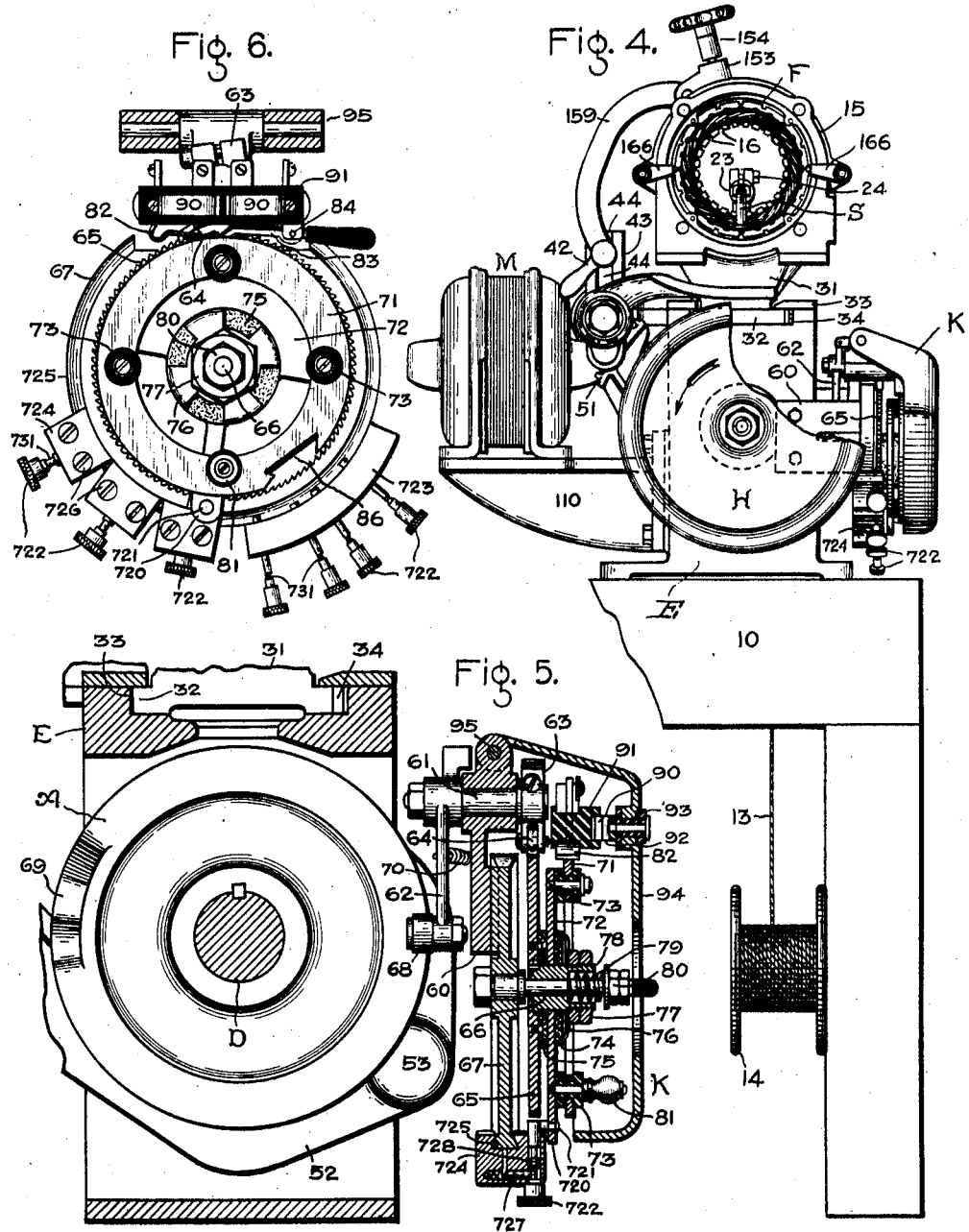

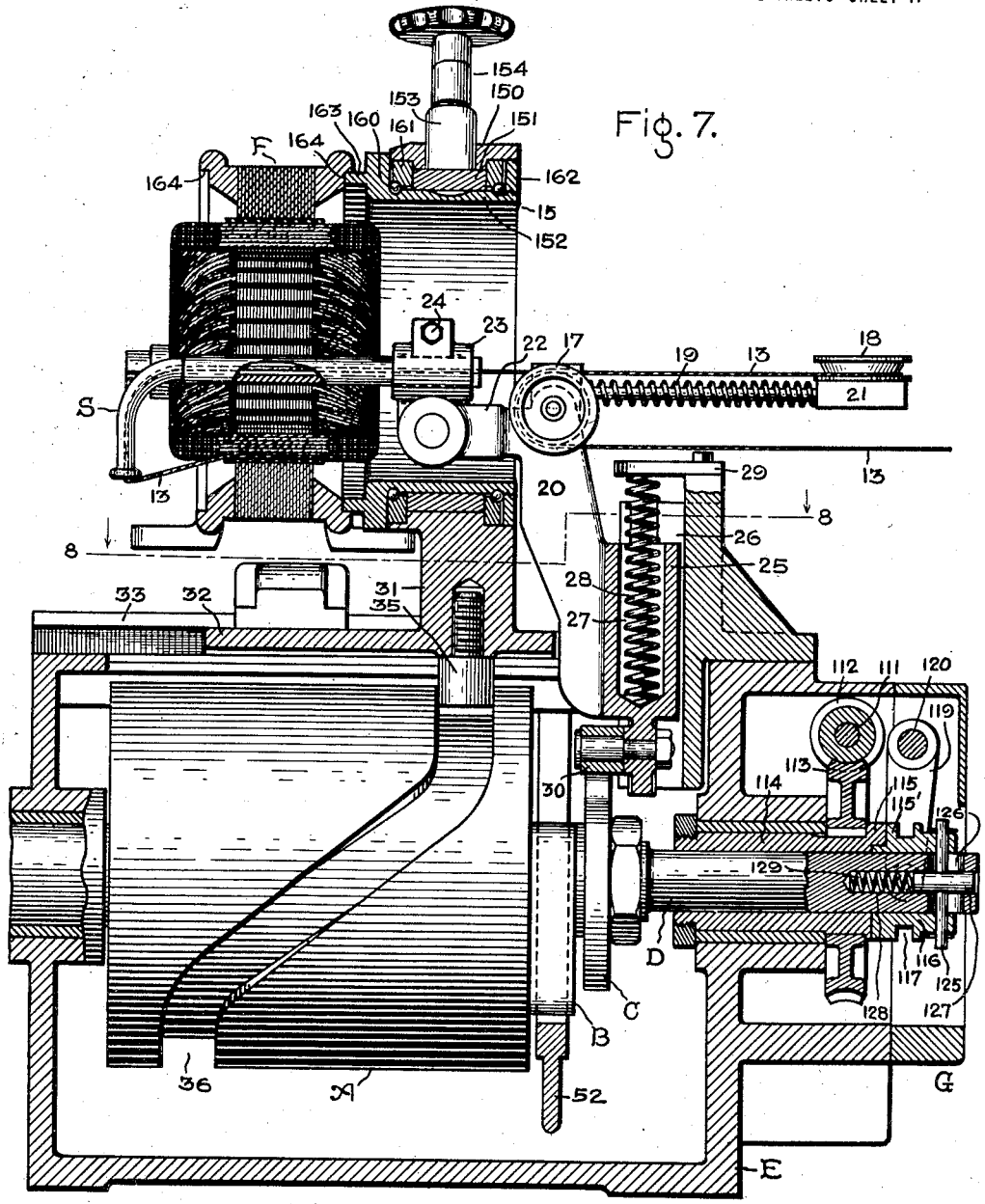

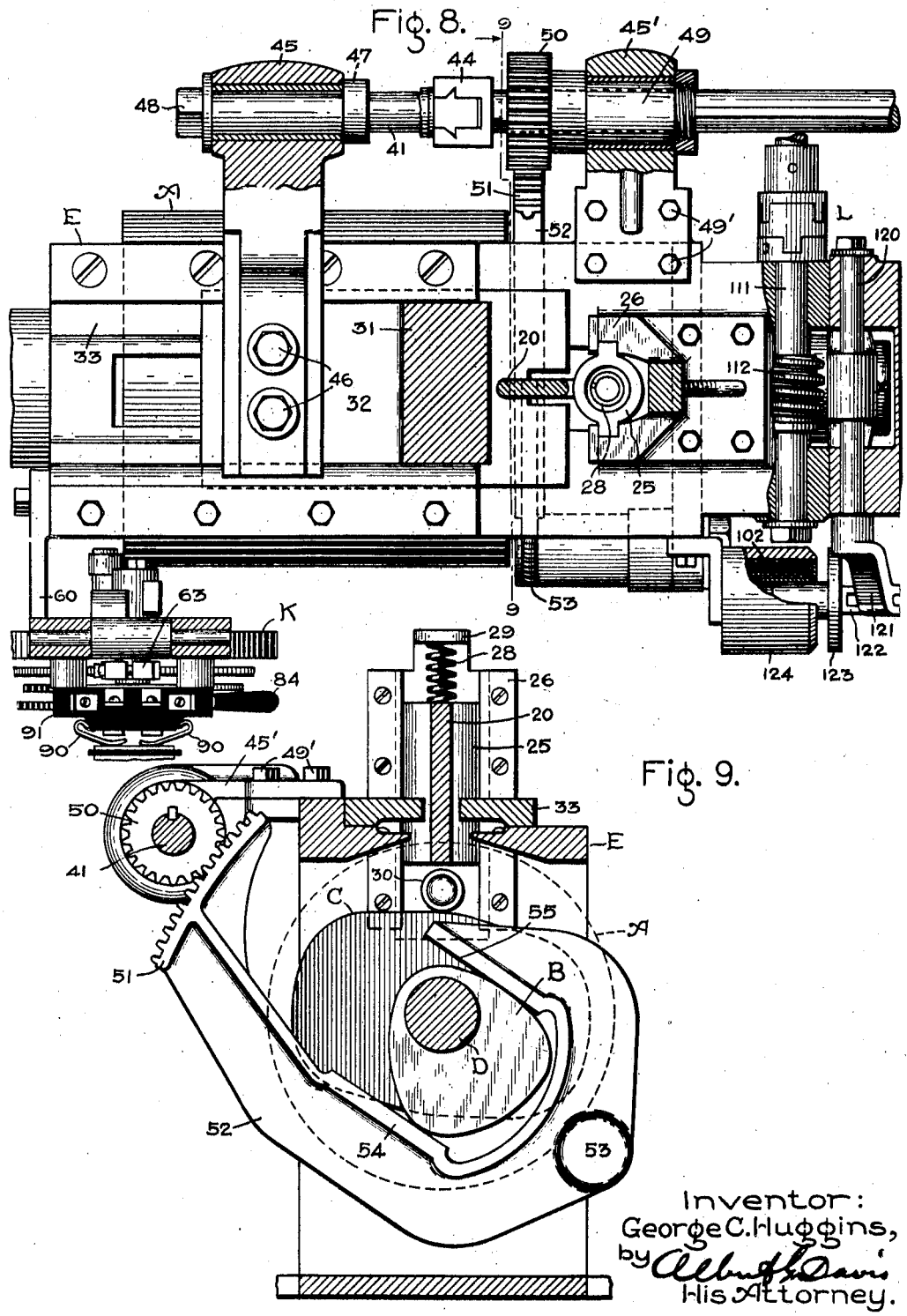

G. C. HUGGINS.
FIELD WINDING MACHINE.
APPLICATION FILED MAY 3, 1917.

1,407,033.

Patented Feb. 21, 1922
9 SHEETS—SHEET 6.

Inventor,
George C. Higgins,
by Albert G. Davis
His Attorney.

G. C. HUGGINS.
FIELD WINDING MACHINE.
APPLICATION FILED MAY 3, 1917.
1,407,033.
Patented Feb. 21, 1922.
9 SHEETS—SHEET 7.
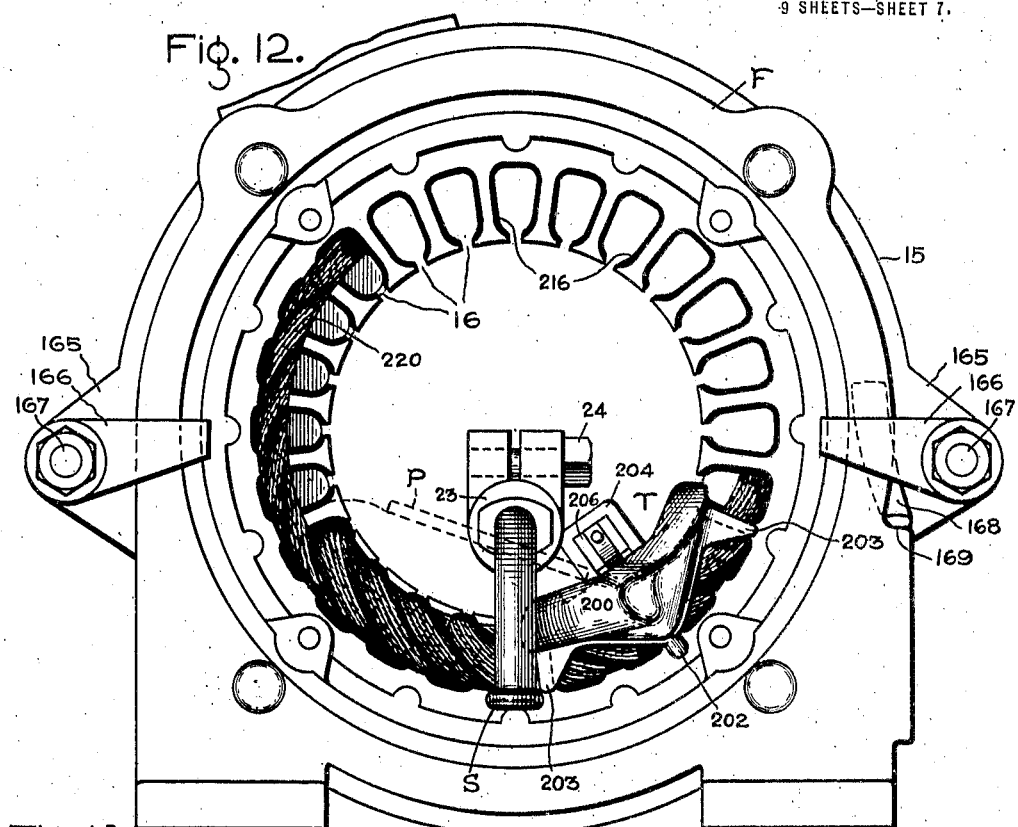
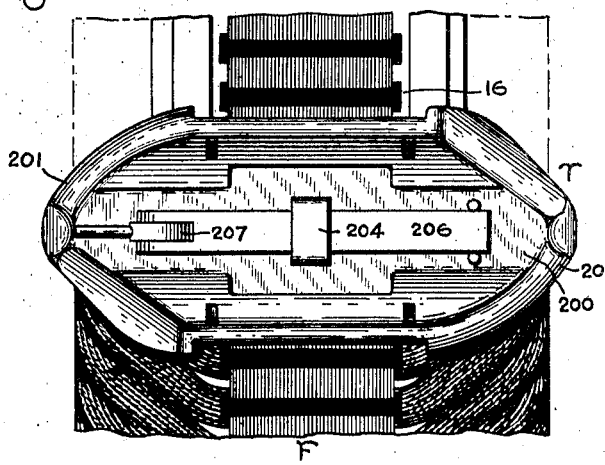
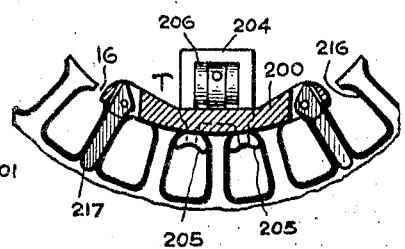
Inventor:
George C. Huggins,
by Albert G. Davis
His Attorney.

G. C. HUGGINS.
FIELD WINDING MACHINE.
APPLICATION FILED MAY 3, 1917.

1,407,033.

Patented Feb. 21, 1922.
9 SHEETS—SHEET 8.

Inventor,
George C. Huggins,
by Albert H. Davis
His Attorney.

G. C. HUGGINS.
FIELD WINDING MACHINE.
APPLICATION FILED MAY 3, 1917.

1,407,033.

Patented Feb. 21, 1922.
9 SHEETS—SHEET 9.

Inventor:
George C. Huggins
by Albert G. Davis
His Attorney.

UNITED STATES PATENT OFFICE.

GEORGE C. HUGGINS, OF LYNN, MASSACHUSETTS, ASSIGNOR TO GENERAL ELECTRIC COMPANY, A CORPORATION OF NEW YORK.

FIELD-WINDING MACHINE.

1,407,033.  Specification of Letters Patent.  Patented Feb. 21, 1922.

Application filed May 3, 1917. Serial No. 166,150.

*To all whom it may concern:*

Be it known that I, GEORGE C. HUGGINS, a citizen of the United States, residing at Lynn, in the county of Essex, State of Massachusetts, have invented certain new and useful Improvements in Field-Winding Machines, of which the following is a specification.

This invention relates to machines for winding insulated conductor wire on the frames of dynamo-electric machines to form field coils or stator windings.

The object of the invention is the provision of a machine by which the conductor wire may be directly wound in the internal or inwardly opening slots of the field frames of electric generators and motors without the employment of skilled labor as is necessary in hand winding, or of first making independent form wound coils and then inserting them by hand in the slots of the field frames, thereby greatly expediting the work and reducing the cost of winding, especially in field frames having a large number of slots and requiring a correspondingly large number of coils.

Figure 1:
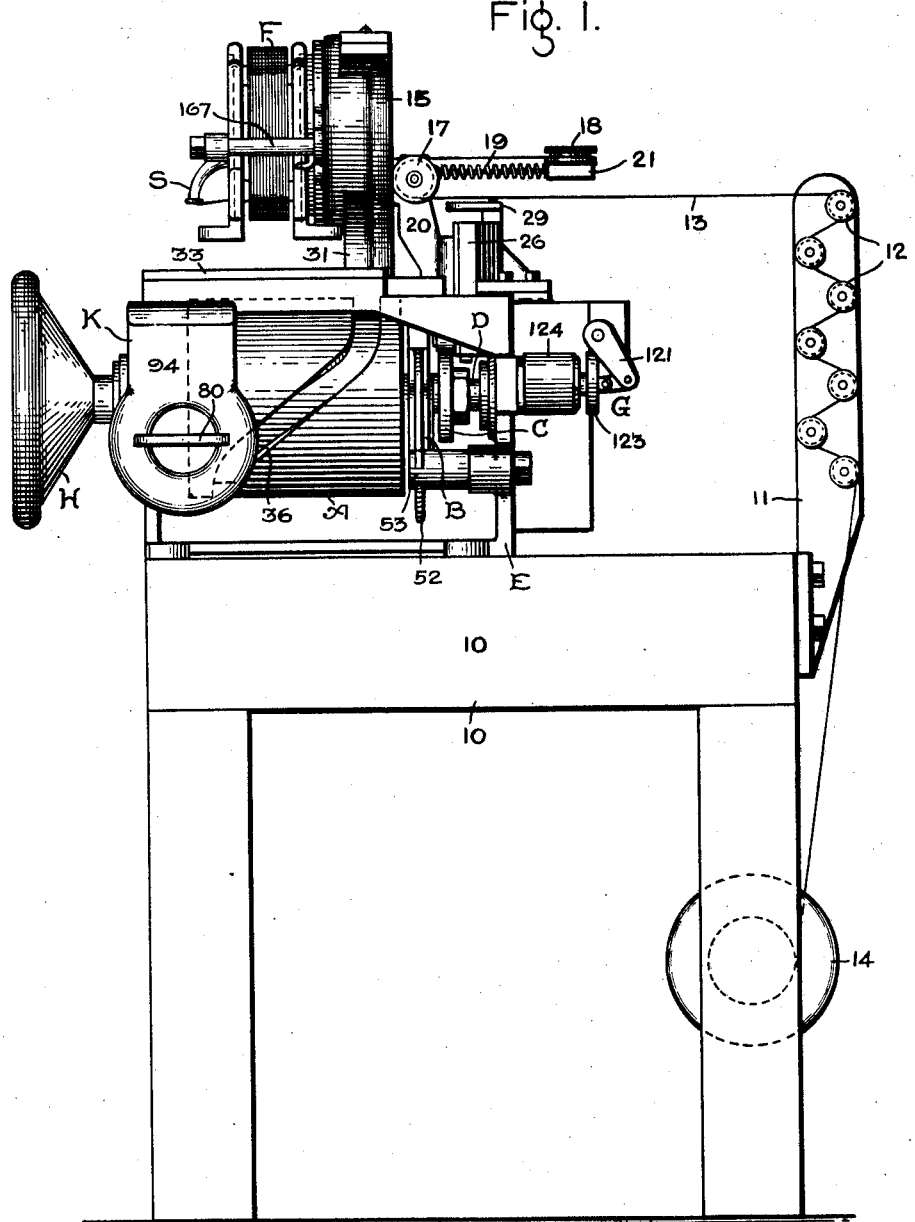
Figure 2:
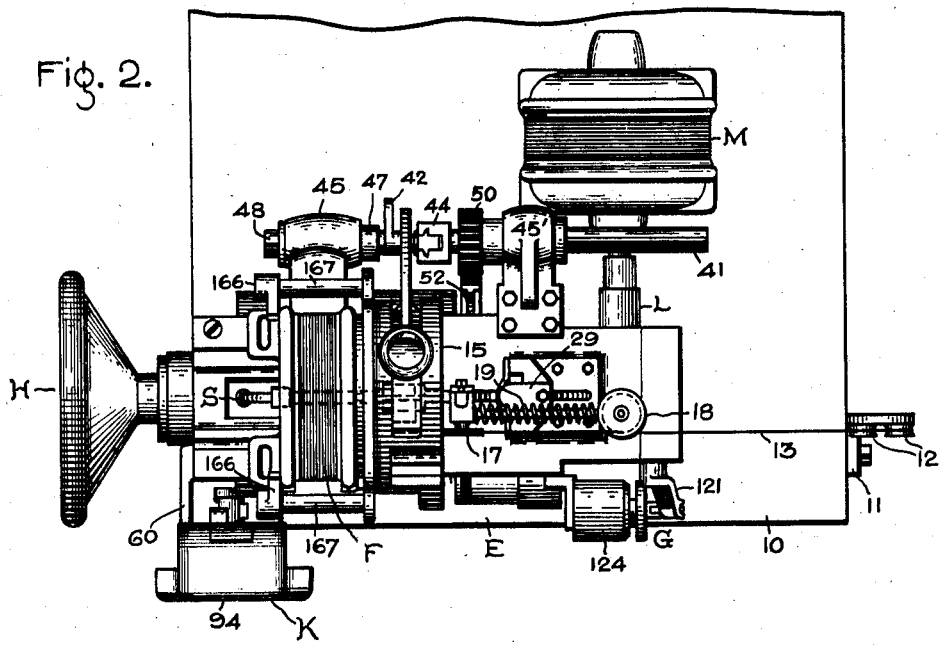
Figure 3:
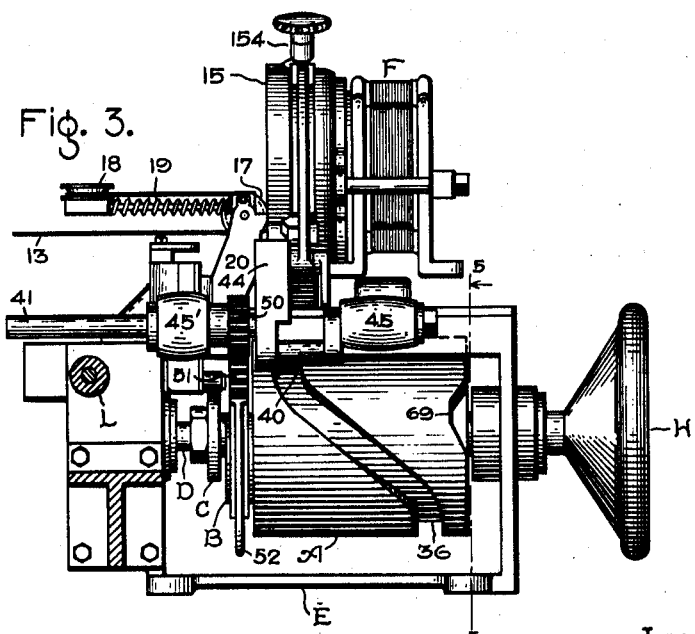
Figure 10:
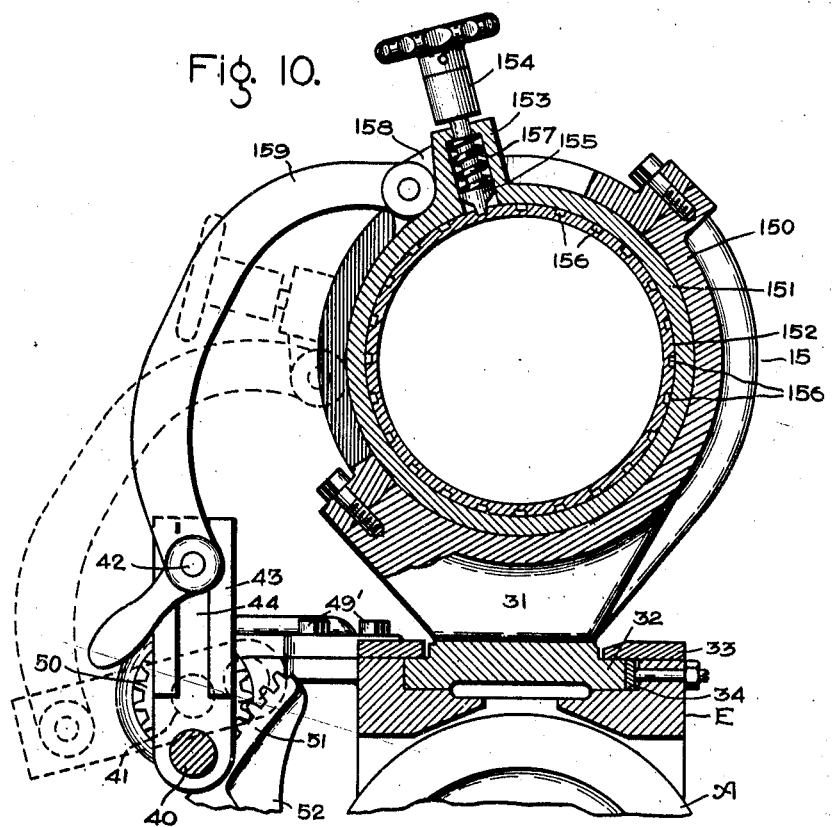
Figure 11:
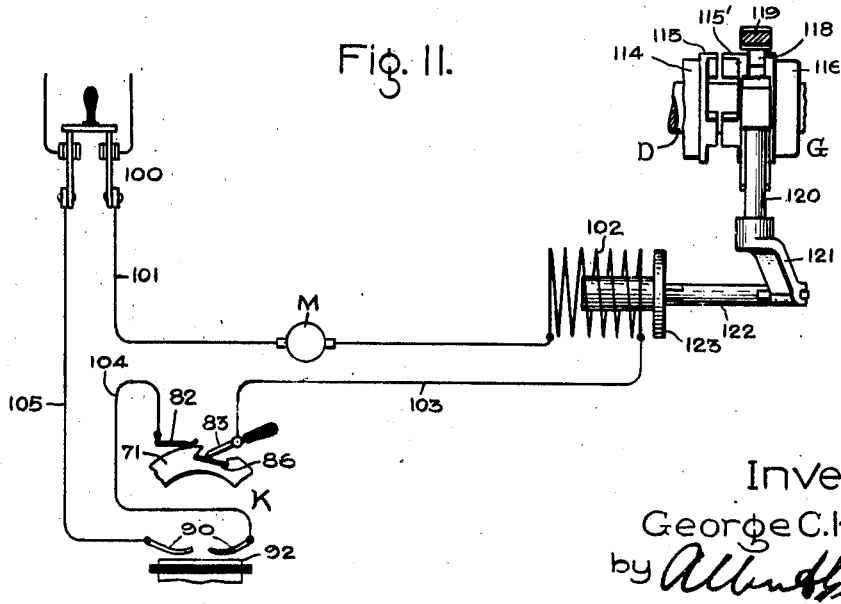
Figure 15:
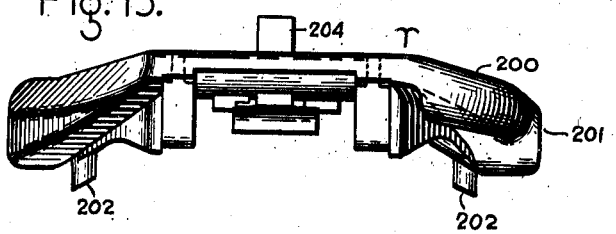
Figure 16:
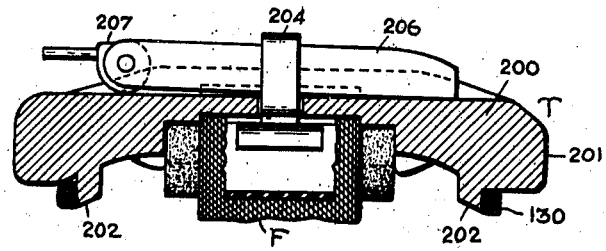
Figure 17:
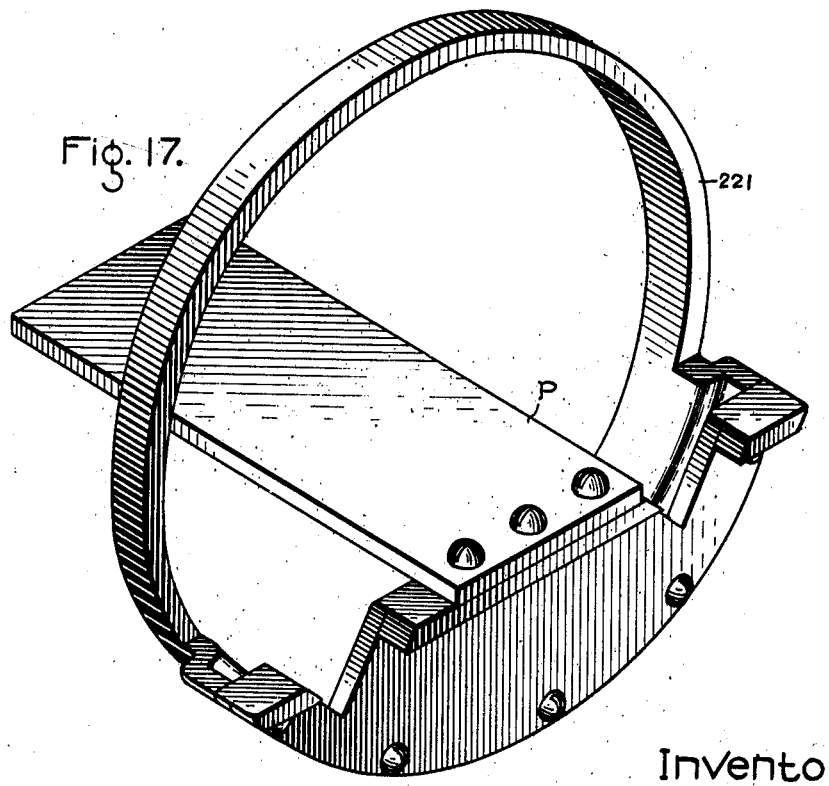
Figure 18:
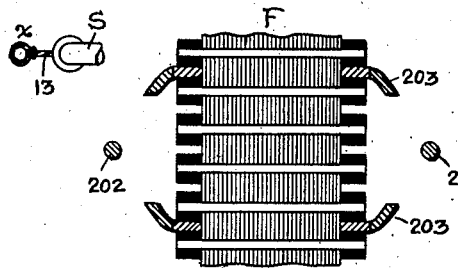
Figure 22:
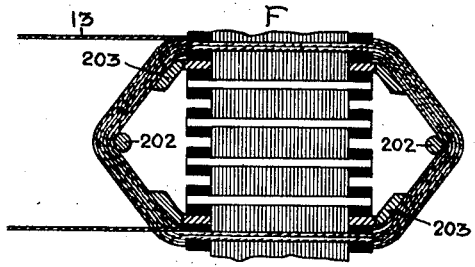

For a more exact understanding of the invention, reference may be had to the annexed drawings, in which Fig. 1 is a right-side elevation of the winding machine embodying my invention; Fig. 2 is a plan view of the same; Fig. 3 is a left-side view with parts removed to show the operating mechanism; Fig. 4 is a front end elevation of the machine with parts broken away; Fig. 5 is a transverse section of the machine on line 5—5 of Fig. 3, showing the construction and arrangement of a counting device. Fig. 6 is a front elevation of the counting device with the cover removed. Fig. 7 is a central longitudinal section of the winding machine; Fig. 8 is a horizontal section taken on the line 8—8 of Fig. 7. Fig. 9 is a transverse section of the winding machine at line 9—9 of Fig. 8, showing the mechanism for producing the oscillating motion required in the winding operation. Fig. 10 is a cross-section of the winding head. Fig. 11 is a diagrammatic view of the electrical connections for operating the clutch. Fig. 12 is a front elevation of the winding head with a motor frame and winding template in position. Fig. 13 is a plan view of the winding template; while Fig. 14 is a cross-section thereof. Fig. 15 is a side elevation of the winding template; while Fig. 16 is a longitudinal section thereof. Fig. 17 is a frame having a plate for temporarily holding a portion of the first wound coils out of the way while the last coils are being wound. Figs. 18 to 21 inclusive show the various steps in the formation of a single turn or convolution of a field coil; and Fig. 22 shows a finished coil.

From a mechanical analysis of the motions necessary in making a field coil winding it is apparent that they can be resolved into three principal motions, which, if properly compounded with respect to their mutual time relations, will reproduce the motion necessary to wind a perfect field coil.

A present day field coil is generally designed to lie in internal slots formed in a cylindrical surface in which the sides of the coil substantially coincide with geometrical elements of the cylindrical surface; accordingly a rectilinear reciprocating motion will lay the sides of the coil. The ends of the coil lie in the arc of a circle so that an arcuate or oscillatory motion will develop the end portions of the coil. In order to wind a coil at the proper depth and one that fits the bottom of the internal slots provided, a radial reciprocatory motion is employed.

These three motions, namely, the rectilinear reciprocatory, the oscillatory and the radial reciprocatory, may be compounded in any convenient manner, but in the form of the invention as illustrated, the proper timing of these motions is achieved by properly designed cams rigidly mounted upon the same driven shaft, together with suitable instrumentalities for transmitting the motions to the wire forming the coil or coils.

Machines designed in accordance with this invention will wind field coils automatically of any desired number of turns when provided with automatic counters.

Referring now to Fig. 1 of the drawings, the three principal motions for winding a field coil are given by the cam drum A, and the cam plates B and C, all rigidly fixed to the driven shaft D journaled in the machine frame E.

The machine frame E is rigidly secured to any suitable support, such as that shown at 10, to which the upright 11 is also secured. Upon the upright 11 are mounted the tension sheaves 12 over which pass the wire 13 fed from the reel 14 to form coils in the internal slots of the motor frame F which is rigidly secured to the winding head 15.

In order to stop the machine when a coil is completed, there is provided a magnetic clutch, generally indicated at G, to throw the machine out of gear.

In order that the coil may have the proper number of turns at the time the machine is stopped, an automatic counter, generally indicated at K is provided.

In order that the cams A, B and C may be adjusted to any desired starting position, the hand wheel H rigidly secured to the driven shaft D is provided.

From the top sheave 12, the wire 13 is fed or guided into the internal slots 16 in the field frame F through a winding horn or guide S by providing the proper relative motions between the motor frame F and the guide S. In order to compensate for any irregular motion which would tend to break the wire, it is desirable to provide take-up sheaves 17 and 18 secured to the winding horn or guide S. The sheave 17 is rigidly secured thereto while sheave 18 is flexibly secured thereto, by interposing a spring 19 between the standard 20, to which sheave 17 is pivoted, and the block 21 to which sheave 18 is pivoted.

The standard 20 has a bracket 22, (see Fig. 7), to which the split ring collar 23 is adjustably attached. The nut 24 on the top of collar 23 provides means for adjustably securing the winding horn or guide S in the collar. It is thus seen that the guide S is rigidly but adjustably carried by the standard 20.

In order to impart the proper relative motions to the motor frame F and the guide S, the cam drum A is designed to impart the rectilinear reciprocatory motion to the motor frame F and the cam plate B to impart the arcuate or oscillatory motion to the motor frame F by a partial rotation of the winding head 15 by which frame F is carried. The radial reciprocatory motion is transmitted to the winding horn or guide S, hence cam plate C has been designed in the form of a figure 8 to reciprocate the standard 20 which supports the guide S down and up during each single oscillation of the field frame F.

The standard 20 is made integral with the base block 25 designed to reciprocate in vertical ways 26 formed in the machine frame E. The block 25 is provided with a bore 27 designed to receive spring 28, which spring reacts against abutment 29 which is conveniently secured to machine frame E. To the lower end of base block 25 is secured the friction roller 30 designed to coact with the cam plate C. It is thus seen that as the driven shaft D rotates, a radial reciprocating motion is transmitted from cam plate C to base block 25 and hence to the guide S.

In order that the winding head 15 with the attached motor frame F may receive rectilinear reciprocating motion, the standard 31, which supports head 15, is provided with a flanged base 32 adapted to slide in ways 33 formed in the machine frame E. To take up lost motion, the ways 33 may be provided with the adjustable gib 34, Fig. 10. The standard 31 is provided with the friction head 35 adapted to engage with the cam groove 36 in the cam drum A. It is thus seen, that as driven shaft D rotates a rectilinear reciprocating motion is transmitted from cam drum A, to standard 31 and hence to motor frame F.

In order that the winding head 15 with the attached motor frame itself may oscillate, the upper portion of the standard 31 is made in the form of a circular frame 150 and in which are two annular members 151 and 152 arranged one within the other and freely movable therein.

The annular oscillating cradle member 151, as clearly shown in Fig. 10, is provided with the integral boss 153 in which is a radially movable hand latch or grabbing member 154 provided on the interior of the boss with an enlargement 155 with pointed end adapted to engage in the notches 156 formed in the face of annular work carrying member 152. The latch is resiliently held in engagement with notches 156 by a spring 157 also contained in the housing 153. The annular cradle member 151 is also provided with lug 158 to which link 159 is pivotally attached.

In order that the annular members 151 and 152 may freely oscillate as a unit in frame 150, ball bearings 160 (see Fig. 7) are provided between annular work supporting member 152 and race rings 161, the latter rings being rigidly seated in opposite ends of frame 150. The annular members are locked against displacement from frame 150 by the guard ring 162 screwed, in this instance on member 152.

The annular work supporting member 152 is provided with a flange 163 which is adapted to fit into a groove or rabbet 164 of the motor frame F, and the latter is rigidly held in place by clamps 166 secured by bolts 167 projecting from lugs 165 formed on the annular member 152. (See Figs. 2 and 12.)

In order that the motor frame F may always be clamped in the proper position, an L-shaped positioning member 168 is provided on annular member 152 adapted to coact with notch 169 of the motor frame F.

The link 159 transmits the oscillatory motion to the annular members 151 and 152 from crank 40 of shaft 41. The link 159 is adjustably secured to crank 40 by means of clamping lever and bolt 42 adapted to be positioned along ways 43 formed on crank block 44.

Shaft 41 is carried at one end by bearing bracket 45 (see Fig. 8) which is rigidly secured to flanged base 32 of the winding head standard by means of bolts 46, so that this bearing member partakes of and reciprocates with the motion transmitted to winding head 15. In order that shaft 41 may move with its bearing member 45, there is formed thereon a collar member 47 and the free end of the shaft is provided with a cap-nut 48. Abutments are thus provided fixing the position of shaft 41 and crank 40 with respect to the winding head 15. The other end of the shaft 41 is slidably supported in a rotary sleeve 49 journalled in a bearing bracket 45′ made fast to the machine frame E by any suitable means, such as bolts 49′. The rotary sleeve 49 is feathered to the shaft 41 and has a pinion 50 fixed thereto and adapted, in turn, to be rotated by a segmental gear 51. Segmental gear 51 is formed on the outer end of a fork-shaped lever 52, pivoted at 53, more clearly shown in Fig. 9. The fork-shaped lever 52 is also provided with working faces 54 and 55 adapted to coact with the plate cam B.

It is thus seen, as driven shaft D rotates, the cam B will swing lever 52 back and forth about its pivot 53, causing shaft 41 to partially rotate first in one direction and then in the other. Crank 40 will consequently transmit an oscillatory motion to cradle member 151 and hence to motor frame F through link 159. The arc through which the member 152 oscillates determines the width of the coil being wound on the motor frame F. In order that the width of the coil may be varied at will, that is winding it in the first and fifth, or first and sixth slots, etc., the connection of the link 159 to the crank block 44 is adjusted as already described.

The automatic counting mechanism is generally indicated at K in Figs. 1, 2 and 4, the detail of which is disclosed more clearly in Figs. 5 and 6. The mechanism K is mounted on machine frame E through the instrumentality of L-shaped bracket 60 (also shown in Fig. 8). The bracket 60 has journalled therein a shaft 61 provided with a crank 62. To the shaft 61 is secured split ring 63, having a pawl 64 pivoted eccentrically thereto. The pawl 64 is adapted to coact with ratchet wheel 65 turning about an axle 66, fixed in circular plate 67. The circular plate is, in turn, secured to plate 60 beneath the rock shaft 61. The crank 62 is provided at its free end with friction roller 68, which rides upon and coacts with a cam surface 69 at the outer end of cam-drum A, so that for each revolution of cam drum A, which corresponds to one convolution of the field winding, the friction roller 68 will ride down into the cam surface 69, owing to the tension on crank 62 caused by its spring 70. Each oscillation of crank 62 will cause pawl 64 to advance the ratchet wheel 65 one notch.

In order that this counting device may control an actuating power current when the required number of turns for the coil have been completed, there is provided a contact ring 71 mounted upon a counter-plate 72 but insulated therefrom by means of insulating posts 73. The plate 72 is frictionally held between leather washers 74 and 75, the latter being rigidly attached to the ratchet wheel 65. The washer 74 is held down by a spring member 76 and nuts 77 are secured to the hub 78 of ratchet wheel 65 to hold the washer and spring member in place, the hub 78 turning about axle 66. The plate 72 is provided with a knob 81 whereby it may be turned by hand. The hub 78 is frictionally held in place on axle 66 by spring 79 secured by nuts and washer as shown at 80.

The contact ring 71 has a spring finger 82, and a hand lever 83, pivoted at 84 in normal relative contact therewith. In order to interrupt the electric circuit as ring 71 turns around, it is provided with an insulating section 86. When the lever 83 drops onto insulating member 86, the conducting relation of contact 82 and lever 83 is interrupted. By suitably adjusting ring 71 with respect to ratchet wheel 65, it is apparent that breaking of the actuating electric circuit may be made to take place after any desired number of notches on the ratchet wheel 65 have been passed over.

In order that the ratchet wheel 65, after each stoppage of the machine may readily be reset, there are provided suitable adjustable stops. Plate 72 is formed with a lug 720 having an inwardly projecting pin 721, adapted to engage with a radially movable stop pin 722. Several stop pins may be arranged en bloc as indicated at 723 or they may be arranged separately as indicated at 724. The base blocks 724 are secured in desired position to the flared edge 725 of plate 67 by means of screws 726.

In order that stop pins 722 may be readily manipulated into and out of operative position the blocks 724 are provided with spring latches 727 adapted to engage wedge shaped bosses 728 on the shanks of the stop pins. By manipulating the proper stop pin, the ratchet wheel 65 may be adjusted to any desired starting position.

In addition to the automatic cycle control of the electric circuit, there is provided a master or safety control of the circuit, consisting of spring contacts 90 mounted on insulating block 91, supported in any desired manner from plate 60, as showing in Fig.

8. The spring contacts 90 engage with the contact member 92 mounted in insulating block 93 secured in cover 94 of the automatic counter K. The cover 94 is hinged at 95 to the L-shaped supporting plate 60. It is thus seen that when the cover 94 is raised for any purpose the electric circuit is broken by the master controller.

Fig. 11 discloses a preferred diagram of the electric circuit. A line switch is indicated at 100. One conductor 101 leads to the driving motor M and thence to the solenoid winding 102 of the magnetic clutch mechanism G. Conductor 103 connects the other terminal of solenoidal winding 102 with contact lever 83 of the automatic circuit controller. From spring contact 82 of the automatic circuit controller, the conductor 104 leads to one of the contacts 90 of the master circuit controller. From the other contact 90 of the master circuit controller, the conductor 105 leads back to the other leg of the line switch 100.

It is thus seen that the electric current actuating driving-motor M and the magnetic clutch G is interrupted either by the master controller when the lid 94 is raised or by the automatic controller when the proper number of turns of the coil being wound have been completed, since contact ring 71 has turned so that contact lever 83 has dropped down on insulating member 86 in this event.

Driving motor M is mounted on a support 110, made fast to the machine frame E, as shown in Fig. 4, and is connected through a coupling L (Fig. 8) to driving shaft 111 (Fig. 7), which is journaled in machine frame E, in this instance transverse to driven shaft D. Power is transmitted from the driving shaft to the driven shaft through worm 112 and worm wheel 113 mounted respectively on driving shaft 111 and driven shaft D.

Worm wheel 113 is not directly secured to the driven shaft D but to a sleeve 114 fitting loosely thereon. One end of sleeve 114 is provided with a notched clutch formation 115, adapted to engage with the similar formation 115' on sliding collar 116, on driven shaft D. Collar 116 is provided with an annular groove 117 adapted to be engaged by prongs 118 (see Figs. 7 and 11) formed on lever 119 secured on shaft 120 journaled in machine frame E. To the outer end of shaft 120 is secured a crank 121 which is pivotally connected through link 122 to armature 123. The armature 123 is actuated by solenoidal winding 102 which is enclosed in housing 124, suitably secured to machine frame E (see Fig. 8).

To enable collar 116 to slide on driven shaft D and to prevent the turning thereon a pin 125 is arranged to pass through radial holes in the collar and engage with slot 126 formed transversely in driven shaft D. In order that the clutch 115 may readily disengage upon interruption of current through the solenoidal winding 102 the pin 125 has an axial plunger 127 working in bore 128 (formed in shaft D) against a spring 129.

In order that the coils wound into the internal slots 16, in the core of the motor frame F, may have properly shaped end portions projecting beyond the edges of the core, I form the coils about a suitable winding form or template T, shown in Figs. 12 to 16. This template T is secured to the core of the motor frame and comprises an oblong body portion 200 having at its ends curved edges 201 for guiding the wire 13 to form a snug coil as indicated at 130 (Fig. 16). The template has downwardly projecting prongs 202 for retaining apices on the coil 130, and is also provided with guard fingers 203 to protect the ends of the coil from becoming damaged by rubbing against the core during the winding operation. To secure the template T in position, an independent U-shaped stirrup member 204 is arranged to project through a suitable opening in the body 200 with each leg terminating in a wedge shaped end 205, designed to engage with the top of the slots 16. A large key member 206 is then pushed through the opening in the stirrup member 204 and made tight by any convenient means, such as the cam 207 placed in the end of the key 206. Upon the completion of one coil, the template T may thus be readily disconnected for removal to a position for forming the next coil by simply removing the key 206. When a field frame F is to be wound, the slots 16 are first lined with sheet insulation as indicated at 216, and as it projects beyond the slots at the ends arrangement is made to support this projecting portion by means of pivoted fingers 217 attached to the template T. As lap wound coils are customarily applied to a field frame the sides of two separate coils occupy a single slot so that one side of a fully wound coil is designed to only half fill one of the slots 16 so that a fully filled slot will have in the lower part a side of the first coil and above a side of, for example, the sixth coil. To completely wind the motor frame F, it is therefore, necessary to remove the first wound side of each of the first few coils, the number to be removed depending on the width of or number of slots spanned by coils being wound. These sides must be held back while the winding is being completed and then replaced by hand.

In order to hold these first wound coils back, there is provided a plate P secured to the annular frame 221 as shown in Fig. 17. During the completion of the winding in the five slots, as indicated at 220 (Fig. 12), the annular frame 221 is inserted in the outer groove 164 of the motor frame F and clamped in place. The frame 221 is inserted so that plate P assumes a position relative to the first five coils as indicated in dotted lines in Fig. 12, so that the portions of such coils now shown on the bottoms of the slots can be folded over and held pressed back by the body of the plate P projecting out over them.

The operation of our machine and the mode of forming a convolution of a field coil may be understood by reference to Figs. 18 to 21.

Figure 19:
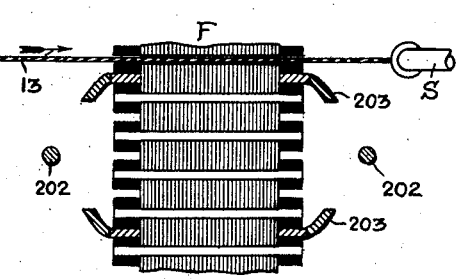
Figure 20:
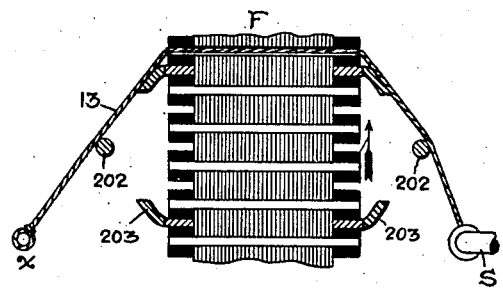
Figure 21:
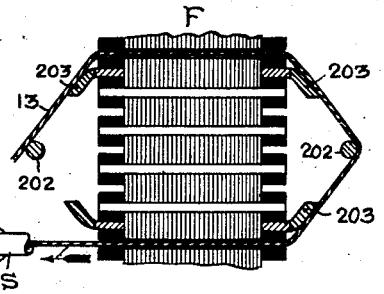

A motor frame F to be wound is clamped in position and the winding head 15 adjusted to the position shown in Figs. 1 and 7 by means of the hand wheel H. The wire 13 from the horn guide S is made fast to any fixed point on the winding head, such as indicated at x in Figs. 18 to 21. The width of the coil having been determined and the counter plate 72 having been set for the proper number of turns, the winding operation is commenced by closing down lid 94 on the counting mechanism K, thereby closing the circuit through the master controller, actuating motor M and throwing the clutch at G in gear. The cam drum A will now reciprocate the winding head 15 back for first lap and draw wire 13 through a slot 16 as indicated in Fig. 19. At the end of the first lap, cam-plate B will rock the lever 52 so as to oscillate members 151 and 152, thereby turning frame F in the direction indicated by the arrow in Fig. 20. During this oscillation the cam-plate C operates to lower the guide horn S so that the wire is drawn taut against the bottom of slot and led under the projecting end of the template T and then raise the horn S to clear the field frame core. While the frame F is in the position indicated in Fig. 20, the cam drum A carries the winding head forward to the initial position, drawing wire 13 through another slot 16 for the other side of the coil as indicated by the arrow in Fig. 21. The cam-plate B now rocks back the lever 52 to oscillate members 151 and 152 back to initial position ready to form another convolution in the coil being wound and cam plate C meanwhile effecting the lowering and raising of the horn S.

When a complete coil of the proper number of turns has been formed, such as shown in Fig. 22, the open space in contact ring 71 will have been advanced by ratchet wheel 65 (moving one notch per convolution), so that contact lever 83 will fall on insulating member 86. The circuit being thus automatically broken, the motor M and the magnet in housing 124 are deënergized and the clutch thrown out of gear, stopping the machine, which is a signal for the operator to come and set the machine to proceed and wind the next coil, which is accomplished by grabbing latch member 154 and releasing it so that the annular member 152 may be rotated for engagement with the next groove.

It is thus seen that I have devised means for compounding the principal motions involved in producing field coils together with automatic counting and stopping mechanism so that motor frames may be completely and expeditiously wound with a minimum expenditure of time and skill on the part of the operator.

While I have in accordance with the patent statutes herein described in detail the structure and mode of operation of the best form of field winding machine at present known to me I would have it understood that I do not mean to be limited thereby in the choice of mechanical equivalents and the embodiment of means to an end except as delineated in the claims hereunto annexed.

What I claim as new and desire to secure by Letters Patent of the United States is:

1. In a machine for winding wire upon a dynamo electric field frame, the combination with driving means, of driven cams for producing three independent principal motions, a winding head and a wire guide actuated by said cams to compound said motions, and a coil registering and stop device controlling said driving means whereby field coils of a desired number of turns are automatically produced in such field frame.

2. In a machine for winding wire upon a dynamo electric field frame, the combination with driving means, of driven means for producing three independent principal motions, a clutch for throwing said driving and driven means into and out of gear, winding devices actuated by said driven means compounding said motions, and an automatic registering controller for actuating said clutch, whereby the machine is automatically thrown out of gear when a field coil of a desired number of turns has been produced in such field frame.

3. In a machine for winding wire upon dynamo electric field frames, the combination with electric driving means, of a winding head, a wire guide, a driven shaft provided with cams for producing three independent principal motions in said head and said guide a clutch for detachably connecting said driving means to said shaft and a convolution registering device having an automatic controller adapted to control the driving means and the clutch and to count the turns in the coil being wound.

4. In a machine for winding wire in the internal slots of a dynamo electric field frame, the combination with a machine frame provided with two sets of ways arranged at right angles to each other, of a winding head adapted to reciprocate in one set of ways, an oscillating member in the winding head, a wire guide adapted to reciprocate in the other set of ways, a driving motor and a driven shaft having cams producing required principal motions for actuating said winding head, oscillating member and wire guide.

5. In a machine for winding wire in the internal slots of a dynamo electric field frame, the combination with a machine frame provided with horizontal and vertical ways, of a winding head adapted to reciprocate in one set of ways, an oscillating member in said winding head, a wire guide adapted to reciprocate in the other set of ways, an electric motor secured to said machine frame, a driven shaft journaled in said frame having a cam for reciprocating said winding head a cam for reciprocating said wire guide and a cam having levers and shafting for actuating said oscillating member, a clutch for gearing said motor to said driven shaft, a registering device having automatic controllers for said motor and clutch, and a retarding device adapted to put a friction drag on the wire fed to said guide.

6. In a winding machine for motor frames, a winding head therefor comprising the combination with a base, standard and frame, of two annular members fitting one within the other, one member having latch means engaging the other whereby said members may be oscillated together, and means on one of said members for securing a motor frame thereto in a predetermined manner.

7. A winding head for winding machines comprising a base adapted to reciprocate in ways, a standard and annular frame, inner and outer annular members mounted in said frame, said outer annular member having a housing provided with a latch member resiliently engaging the inner member, a link pivotally attached and adapted to oscillate said members, said inner member provided with a flange, clamping means, and a positioning member adapted to secure a motor frame thereto in a predetermined manner.

8. An automatic counting mechanism for winding machines having a ratchet wheel for registering the turns wound and a contact ring adjustably secured thereto provided with means for interrupting the electric current actuating the winding machine.

9. In a coil registering and stop device for winding machines, the combination with a turn actuated pawl, of a ratchet wheel, a contact ring provided with an insulated space secured to and turned by the ratchet wheel, contact members bearing on said ring, a cover, and additional contact members pressed into conducting relation by said cover.

10. In a counting device for winding machines, the combination of an actuating pawl, a ratchet wheel, actuated in one direction by said pawl a contact ring frictionally mounted on said wheel and insulated therefrom, said ring having an insulated space and a lug, electric contact members bearing on said ring, and adjustable stop pins coacting with said lug, to stop the ratchet wheel, when moved in reversed direction.

11. In a machine for winding wire in internal slots of a dynamo electric frame, the combination of a template secured to said frame, a wire guide, and means for moving the motor frame and wire guide relatively to one another in such a manner as to form a coil about said template and cause it to enter the internal slots of said frame.

12. In a machine for winding wire in the internal slots of a dynamo electric frame, the combination of a template removably secured to said frame and provided with guards and guiding members, a wire guide and means for moving the motor frame and wire guide relatively to one another whereby field coils are wound about said template and caused to enter the slots of said frame.

13. A template adapted for use on a winding machine having a curved edge, prongs and guard members secured thereto in such manner that a coil of desired form may be snugly wound thereabout, and a cam secured anchoring device.

14. A template adapted for use on a winding machine, comprising a body member provided with curved edges, prongs, guard members, and a securing device having an anchoring member and coacting wedge.

15. In a winding machine, the combination with a motor frame of a wire guide, means for moving the motor frame and wire guide relatively to each other in a desired manner, and removable means cooperating with the motor frame for holding back a portion of the first wound coils whereby a complete lap winding may be automatically wound on the motor frame.

16. In a winding machine, the combination with a winding head, of a motor frame adapted to be clamped thereto, a wire guide, means for moving the winding head and guide relatively to each other in a desired manner, and a removable frame secured to the motor frame and adapted to hold back a portion of the first wound coils.

In witness whereof, I have hereunto set my hand this first day of May, 1917.

GEORGE C. HUGGINS.